Patented Aug. 9, 1938

2,126,670

UNITED STATES PATENT OFFICE

2,126,670

ACCELERATOR OF VULCANIZATION

Winfield Scott, Akron, Ohio, assignor to Wingfoot Corporation, Wilmington, Del., a corporation of Delaware No Drawing. Application April 3, 1936, Serial No. 72,667

15 Claims. (Cl. 18—53)

This invention relates to a new class of chemical compounds which have been found valuable as accelerators of rubber vulcanization. More particularly, the compounds are derivatives of mercapto aryl thiazoles which may be called 1-thio aryl thiazyl N-methyl amines.

Heretofore various derivatives of mercapto aryl thiazoles have been discovered, among them being 2-4-dinitro phenyl benzothiazyl sulphide, benzoyl benzothiazyl sulphide and various aldehyde amine reaction products of mercapto aryl thiazoles such as anilino methyl benzothiazyl sulphide.

This invention resides in the discovery of a new class of mercapto aryl thiazole derivatives which are prepared by reacting a mercapto aryl thiazole with a methylol amide. The compounds have been found to be mild accelerators of vulcanization when used by themselves and to be very active accelerators when activated with a basic nitrogen accelerator of another type such as diphenylguanidine. The compounds of the invention are definite crystalline materials and may be readily prepared by heating the desired methylol amide with the desired mercapto aryl thiazole at a temperature sufficiently high and for a period sufficiently long to split out water. A general equation believed to represent the reaction involved in the preparation of the compounds of the invention is as follows:

$$B-SH + HO-CH_2-\underset{|}{\overset{H}{N}}-R \longrightarrow H_2O + B-S-CH_2-\underset{|}{\overset{H}{N}}-R$$

In the above equation B stands for an aryl thiazyl radical and R for an acyl radical.

As illustrative of the invention, but not limitative thereof, are the following examples:

Example 1

45 parts by weight of formamide and 30 parts by weight of paraformaldehyde were heated together at a temperature ranging from 70° to 100° C. for a period of 30 minutes. To this hot material were then added 167 parts of 1-mercaptobenzothiazole. The heating was continued with rising temperature until 130° C. was reached after which it was maintained at 130°–140° C. for a period of 1½ hours. The mass was then cooled quickly, whereupon a soft resin formed which crystallized on standing. In order to remove any unreacted constituents, the mass was triturated with an aqueous solution of sodium carbonate. The insoluble material obtained, 1-thio benzothiazyl N-methyl formamide, was in the form of a yellow powder, and after crystallization from alcohol, melted at 166° C. An analytical examination showed it to contain an average nitrogen content of 12.42% and an average sulphur content of 29.23% as compared with the theoretical nitrogen and sulphur contents for thio benzothiazyl N-methyl formamide of 12.50% and 28.58%, respectively. The equation representing the reaction is considered to be as follows:

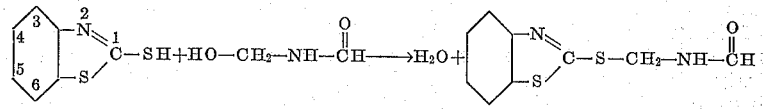

Example 2

1-thiobenzothiazyl N-methyl acetamide may be prepared similarly. Thus, 59 parts by weight of acetamide and 30 parts by weight of paraformaldehyde were heated together to form the methylol acetamide. 167 parts of mercaptobenzothiazole were then added slowly to this material while still hot. A reaction temperature of 140°–150° C. was maintained until no more water was evolved. After cooling and triturating with sodium carbonate solution, the 1-thio benzothiazyl N-methyl acetamide was obtained as a yellow insoluble powder. It was purified by crystallization from alcohol and after the first crystallization melted at 163° C. Upon analysis, it was found to contain an average nitrogen content of 11.40% and an average sulphur content of 27.10% as compared with the theoretical nitrogen and sulphur contents for thio benzothiazyl N-methyl acetamide of 11.76% and 26.88%, respectively. The equation is believed to be as follows:

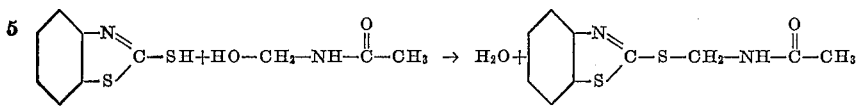

Example 3

1-thio benzothiazyl N-methyl benzamide was prepared as follows: 10 parts of benzamide and 2.5 parts of paraformaldehyde were heated together at a temperature of 120°–130° C. until a homogeneous liquid was obtained, which required approximately 30 minutes. 13.8 parts of 1-mercaptobenzothiazole were then added and the mixture heated at 140°–150° C. until no more water was given off. On cooling, the product set to a brittle resin which soon became a hard crystalline mass. After crystallizing from alcohol, the crystals melted at 150° C. A nitrogen analysis gave an average content of 9.08% as compared with the theoretical nitrogen content of thio benzothiazyl N-methyl benzamide of 9.33%. The reaction is believed to proceed as follows:

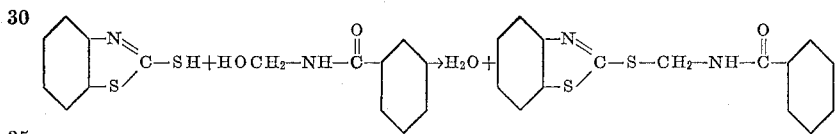

Other compounds of the class may be prepared similarly. Illustrative are 1-thio 5-nitro benzothiazyl N-methyl formamide, 1-thio 5-chlor benzothiazyl N-methyl propionamide, 1-thio 3-ethoxy benzothiazyl N-methyl butyramide, 1-thio 3-phenyl benzothiazyl N-methyl acetamide, 1-thio alpha naphtha thiazyl N-methyl formamide, 1-thio benzothiazyl N-methyl furoamide, 1-thio 3-phenyl benzothiazyl N-methyl o-salicylamide, 1-thio benzothiazyl N-methyl stearamide, 1-thio 5-nitro benzothiazyl N-methyl p-methyl benzamide, 1-thio benzothiazyl N-methyl valeramide, 1-thio benzothiazyl N-methyl lauramide, 1-thio benzothiazyl N-methyl lactamide, etc.

While those derivatives prepared from 1-mercaptobenzothiazole are preferred in the practice of the invention, it will be understood that the 1-mercapto aryl thiazoles generally, and, particularly, the 1-mercapto arylene thiazoles of the benzene and naphtalene series, may be employed in preparing the compounds of the invention. Other mercapto aryl thiazoles are 1-mercapto 3-phenyl thiazole, 1-mercapto 3- or 5-methoxy benzothiazole, 1-mercapto 4-nitro 5-chlor benzothiazole 1-mercapto 3- or 5-hydroxy benzothiazole, the 1-mercapto tolyl thiazoles, the 1-mercapto xylyl thiazoles and other similarly substituted 1-mercapto benzo- and naphtho thiazoles. It will be understood that by the term "arylene thiazoles of the benzene and naphthalene series" employed herein and in the appended claims it is meant to include non-hydrocarbon substituents exemplary of which are those herein listed. Where the word "arylene" is to connote only hydrocarbon radicals the expression "hydrocarbon arylene" will be used.

Likewise, many other amides than those specifically described may be used in the practice of the invention, although those derived from aliphatic mono basic acids are preferred. Other amides are those derived from isobutyric acid, palmitic acid, oleic acid, capric acid, linoleic acid, caproic acid, naphthoic acid, etc.

Illustrating the use as accelerators of vulcanization of the compounds of the invention is the following rubber formula in which they have been found valuable:

|  | Parts by weight |
|---|---|
| Smoked sheet rubber | 100 |
| Zinc oxide | 5 |
| Sulphur | 3 |
| Accelerator | As indicated |

Illustrative accelerators of the invention were incorporated into separate portions of a compounded rubber batch corresponding to the above formula and cured for varying periods of time. In the following table are given the tensile and elongation figures for the optimum cure of each of the stocks as determined by hand tests.

| Accelerator | Amt. pts. by wt. | Cure mins. @ ° F. | Tensile at break kgs/cm.² | Ult. elg. percent | Modulus kgs/cm.² | |
|---|---|---|---|---|---|---|
|  |  |  |  |  | 500% | 700% |
| 1 | .50 | 30 @ 285° | 123 | 820 | 20 | 63 |
| 1 DPG | .50 .20 | 20 @ 260° | 150 | 730 | 34 | 127 |
| 2 | .50 | 80 @ 260° | 131 | 820 | 20 | 64 |
| 2 DPG | .50 .20 | 30 @ 260° | 179 | 740 | 36 | 144 |
| 3 | .50 | 40 @ 285° | 126 | 830 | 19 | 56 |

In the above table the accelerators employed are identified as follows:

1. 1-thiobenzothiazyl N-methyl formamide
2. 1-thiobenzothiazyl N-methyl acetamide
3. 1-thiobenzothiazyl N-methyl benzamide
DPG. Diphenylguanidine From the above table, it will be seen that the compounds of the invention, particularly those derived from aliphatic amides are very active accelerators of vulcanization when activated by a basic nitrogen-containing accelerator of another class such as diphenylguanidine. The others are also good accelerators of vulcanization. Other basic nitrogen-containing accelerators which may be substituted for diphenylguanidine are diortho tolyl guanidine, diphenylguanidine neutral phthalate, diphenylguanidine acid or neutral oxalate, diphenylguanidine neutral succinate, 2-4-diamino diphenyl amine, urea succinate, p-p′ diamino diphenyl methane, etc.

It will be understood that the various examples given in the description of the invention are but illustrative and not limitative thereof. It is intended that the patent shall cover, by suitable expression in the appended claims, all features of patentable novelty residing in the invention.

What I claim is:

1. The process of accelerating the vulcanization of rubber which comprises vulcanizing in the presence of a compound having the formula

B—S—CH₂—N—R
|
H wherein B is the 1-benzothiazyl radical, and R is an aliphatic acyl radical.

2. The process of accelerating the vulcanization of rubber which comprises vulcanizing in the presence of a compound having the formula

B—S—CH₂—N—R
|
H wherein B is the 1-benzothiazyl radical, and R is the acetyl radical.

3. The process of accelerating the vulcanization of rubber which comprises vulcanizing in the presence of a compound having the formula

B—S—CH₂—N—R
|
H wherein B is the 1-benzothiazyl radical, and R is the formyl radical.

4. The process of accelerating the vulcanization of rubber which comprises vulcanizing in the presence of a 1-thio aryl thiazyl N-methylene aliphatic amide.

5. The process of accelerating the vulcanization of rubber which comprises vulcanizing in the presence of a 1-thio arylene thiazyl N-methylene aliphatic amide, said arylene radical being selected from the benzene and naphthalene series.

6. The vulcanizates prepared according to the process of claim 1.

7. The vulcanizates prepared according to the process of claim 5.

8. The 1-thio aryl thiazyl N-methylene aliphatic amides.

9. The 1-thio benzothiazyl N-methylene aliphatic amides.

10. 1-thio benzothiazyl N-methylene formamide.

11. 1-thio benzothiazyl N-methylene acetamide.

12. 1-thio benzothiazyl N-methylene benzamide.

13. The 1-thio arylene thiazyl N-methylene aliphatic amides, the arylene radical being a member of the benzene and naphthalene series.

14. A process of accelerating the vulcanization of rubber which comprises vulcanizing in the presence of a 1-thio aryl thiazyl N-methylene amide in which the aryl group belongs to the benzene and naphthalene series and the amido group is characterized by the presence of an acyl radical of a mono basic acid.

15. The 1-thio aryl thiazyl N-methylene amides in which the aryl group belongs to the benzene and naphthalene series and the amido group is characterized by the presence of an acyl radical of a mono basic acid.

WINFIELD SCOTT.